United States Patent

[11] 3,577,793

| [72] | Inventor | Allen V. C. Davis<br>5600 Alta Canyada, La Canada, Calif.<br>91011 |
|---|---|---|
| [21] | Appl. No. | 868,660 |
| [22] | Filed | June 30, 1969 |
| [45] | Patented | May 4, 1971<br>Continuation-in-part of application Ser. No.<br>717,522, Apr. 1, 1968, now abandoned. |

[54] MECHANICAL MOTION TRANSMITTER
7 Claims, 3 Drawing Figs.
[52] U.S. Cl............................................. 74/100,
74/17.8
[51] Int. Cl................................................F16h 21/44,
F16j 15/50
[50] Field of Search........................................ 74/100, 96,
17.8

[56] References Cited
UNITED STATES PATENTS

| 1,736,974 | 11/1929 | King.............................. | 74/17.8 |
| 1,768,625 | 7/1930 | Olsen............................. | 74/100 |
| 2,512,380 | 6/1950 | Quartullo...................... | 74/96 |
| 2,539,386 | 1/1951 | Albert........................... | 74/17.8 |
| 3,067,623 | 12/1962 | Kinderman................... | 74/100 |
| 3,183,727 | 5/1965 | Brown et al................... | 74/17.8 |

Primary Examiner—Fred C. Mattern, Jr.
Assistant Examiner—Wesley S. Ratliff, Jr.
Attorney—Perry E. Turner ABSTRACT: There is disclosed a switch unit having a metal plate forming one wall of a fluid chamber, such plate supporting an electrical switch exteriorly of the chamber. A thin-walled tube is welded at one end in an opening in the metal plate, with the outer end of the tube positioned to actuate the switch plunger. Extending through the tube is a rod having a modulus of elasticity that is greater than that of the tube. A transverse arm on the end of the rod in the chamber is movable by a pressure-responsive element to subject the outer end of the rod, and hence the tube, to transverse operation for actuating the switch plunger.

Patented May 4, 1971

3,577,793

INVENTOR.
ALLEN V. C. DAVIS

BY Perry E. Turner

ATTORNEY 3,577,793

MECHANICAL MOTION TRANSMITTER

CROSS-REFERENCE TO RELATED APPLICATION

This is a continuation-in-part of my copending application, MECHANICAL MOTION TRANSMITTER, Ser. No. 717,522, filed Apr. 1, 1968, now abandoned.

BACKGROUND OF THE INVENTION

1. Field of the Invention

This invention relates to mechanical motion-transmitting devices, and more particularly to a novel structure for transmitting movements through a wall.

2. Description of the Prior Art

Motion transmitters providing hermetically sealed separation of drive and driven chambers employ elastically deformable walls. These walls are either axially deformable as a diaphragm or bellows, or rotationally deformable as a torsion tube. The former has the advantage of low force operation together with the disadvantage of low ambient pressure resistance. The latter has the disadvantage of high operating force together with the advantage of high ambient pressure resistance.

SUMMARY OF THE INVENTION

The invention comprises an elongated, bendable tube having an open end secured in a wall, and a relatively rigid rod in the tube extending through the wall. The rod is adapted to be pivoted in the open end of the tube to thereby move the opposite end of the rod, and hence bend the tube, transverse to its axis. Such construction has the dual advantage of being operable by low forces while being insensitive to high ambient pressures. This provides a low spring rate which permits snap operation of the transmitter when used in conjunction with a negative spring rate operator.

DESCRIPTION OF THE PREFERRED EMBODIMENT

Figure 1:
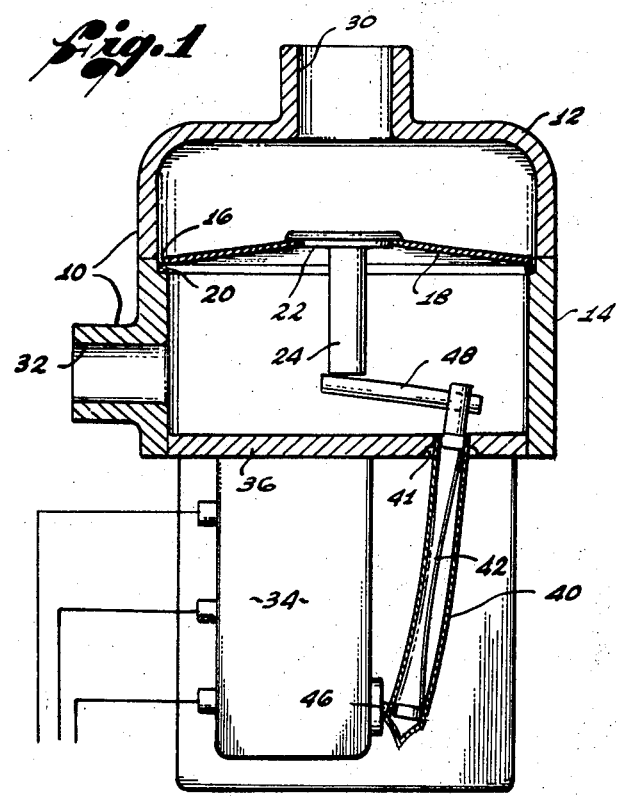
FIG. 1 is a longitudinal sectional view of a fluid chamber wherein one wall supports the motion transmitter of my invention, and showing the outer extremity of the transmitter in a preload position for holding a switch in one condition.
Figure 2:
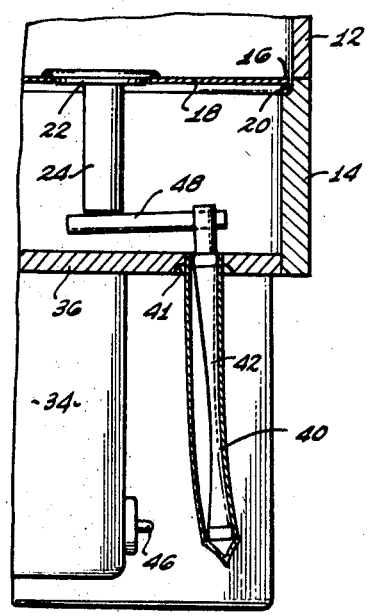
FIG. 2 is a fragmentary sectional view like FIG. 1, wherein a pressure-operated device in the chamber has actuated the transmitter, and moved it to a position to place the switch in a second condition.

Referring to FIG. 1, a housing 10 has upper and lower sections 12, 14, and the peripheral edge portion of a limp diaphragm 16 is sandwiched between the confronting ends of such sections. The diaphragm 16 and the upper and lower sections 12, 14 are welded together.

The diaphragm 16 overlays a coned disc spring 18, the periphery of which rests on a support ring 20 that is located on a suitable shoulder formed in the lower housing section 14. A flanged disc 22 is located in the opening in the upper end of the spring 18, such disc 22 having a flange that rests on the spring 18. The disc 22 has a center post which extends downwardly, toward the lower end of the lower housing section 14.

As shown, the upper housing section 12 has a fluid inlet port 30, and the lower housing section 14 has a fluid inlet port 32. Typically, the fluid inlet port 32 is connected to a source of reference pressure, and the inlet port 30 is connected to a source of varying pressure. Further, the spring 18, which is a snap action spring with a characteristic negative spring rate, remains in the position shown until the pressure of fluid against the upper surface of the diaphragm 16 exceeds the pressure of fluid in the lower part of the housing by a predetermined amount. For example, the reference pressure may be 6,000 p.s.i., and the spring 18 is adapted to remain undeflected unless the acting pressure of fluid in the upper part of the housing reaches 6,010 p.s.i.

When the pressure differential reaches 10 pounds, the spring 18 snap deflects downwardly, in which case the disc 22 and the diaphragm 16 overlaying the spring 18 and disc 22 follow the movement of the spring. In the arrangement shown, the sudden downward thrust of the post 24 is utilized to actuate my motion transmitter and to operate a switch 34 that is carried on the lower surface of a plate 36 that closes the lower end of the lower housing section 14.

Figure 3:
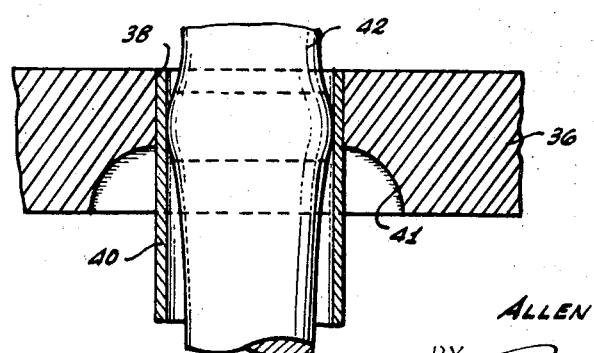
FIG. 3 is an enlarged, fragmentary sectional view of the plate through which parts of my motion transmitter extend, to aid in explaining the operation thereof.

In this latter connection, the plate 36 forms the lower wall of the housing 10, and to this end is suitably welded at its periphery to the lower housing section 14. Referring to FIG. 3 along with FIG. 1, the plate 36 has an opening 38, and a thin-walled metal tube 40 extends into the opening 38 and is welded to the plate 36. As shown, the upper end of the tube 40 is attached within the plate 36. Further, the lower surface of the plate 36 is milled, countersunk or other wise formed so that the opening 38 is enlarged in the lower surface of the plate 36, as indicated at 41.

Extending through the tube 40 is an elongated rod 42. Within the upper end of the tube 40, and adjacent the upper portion of the opening 38, the rod 42 has a short length thereof that is in wall-to-wall contact with the inner surface of the tube 40. Similarly, the outer end of the rod 42 has a portion in wall-to-wall contact with the surrounding tube 40. In the example shown, the intermediate portions of the rod 42 taper to provide clearance for pivoting the rod and accommodating bending of the tube. The lower end of the tube 40 is closed, and preferably is made fluidtight, e.g., as by pinching the end and forming a weld of parent metal by heating the contacting parts to their melting temperature in an inert gas.

In accordance with my invention, the rod 42 is relatively rigid compared to the tube 40. Stated otherwise, the tube 40 has a substantially lower modulus of elasticity than the rod 42. Thus, the rod 42 can be cocked at its upper end, and the tube 40 deforms to follow the movement of the rod 42. Conversely, the tube 40 may initially be formed so that it is not straight, so that when the rod 42 is inserted therein, the axis of the rod is at an angle to the axis of the opening 38 in the plate 36, i.e., initial deformation provides a preload. This preload arrangement of the rod and tube assembly is employed in FIG. 1.

As shown, the lower end of the tube 40 is normally positioned to depress the plunger 46 of the switch 34. Above the plate 36, a crank arm 48 is secured to the upper end of the rod 42, and its free end is positioned to be engaged by the lower end of the post 24 in the normal position of the spring 18. When the spring 18 snaps downwardly, the post 24 forces the end of the arm 48 downwardly, whereupon the upper end of the rod 42 is rocked in the upper end of the tube 40, and the lower end of the rod is forced outwardly. Due to the differences in moduli of elasticity between the rod 42 and the tube 40, the rod 42 carries the lower end of the tube 40 away from the plunger 46. Accordingly, where the switch 34 is open its plunger 46 is depressed, as in FIG. 1, the tube and rod assembly responds to snap action of the spring 18 to close the switch 34. Such switch closure may, for example, connect an alarm circuit which signifies that pressure differential across the diaphragm and spring assembly 16, 18 has exceeded a desired level.

To better understand the invention, reference will be made to a motion transmitter which has been made for a pressure switch application as in FIG. 1. In such device, the tube 40 is made of stainless steel, and the rod 42 is made of tungsten. The tube dimensions are: 0.5-inch long; 0.046-inch o.d.; 0.003-inch wall thickness. The ends of the rod are 0.040-inch diameter, and the rod tapers to 0.035-inch diameter at its midpoint. The modulus of elasticity of such a rod is approximately twice that of the tube. With an arm 48 approximately three-fifths the length of the rod, this device achieves a 1:1 ratio of the movements of the ends of the arm 48 and the tube 40. Further, such device is stable and reliable in effecting operation of a switch having a substantial plunger movement. Also, I have found that a motion transmitter made in accordance with my invention is one that is operable from extremely small forces, e.g., of the order of 2 to 5 ounces, and provides the low positive spring rate needed for combination with and to permit snap of a negative rate disc spring.

From the foregoing, it will be seen that I have provided a motion transmitter for use in high-pressure environments, and which transmits motion from one side to the other of a rigid wall without resort to fragile elements such as diaphragms and bellows, and without need for a seal. As will now be observed, fluid in the chamber below the spring 18 surrounds the rod 42 in the tube 40. Accordingly, my motion transmitter is unaffected by wide pressure variations of fluid within the tube.

As will be apparent, various modifications can be made in the motion transmitter illustrated and described without departing from the spirit and scope of my invention. For example, the rod 42 need not be undercut in its midportion so that it is symmetrical, i.e., material of the rod may be removed only where needed to provide necessary clearance. Also, the rod may be initially preloaded, so that inserting it into a straight tube preloads the tube. Further, the rod and the arm thereon may be formed of a single L-shaped element, or of two pieces, as desired. In fact, the rod need not have an arm, i.e., the rod can be pivoted by applying force thereto at an appropriate angle. In addition, at the movable end of the tube, the rod and tube may be relatively slidable, or they may be secured together. If they are thus secured together, the rod and tube are made sufficiently long to insure the desired tube deformation when the rod is actuated.

I claim:
1. In combination:
   a rigid stationary metal plate;
   a metal tubular element integral with and extending from one surface of said plate,
      said plate having a through opening to the interior of said tubular element,
      said tubular element being a stiff element of a wall thickness sufficient to withstand a predetermined maximum internal fluid pressure;
   a stiff metal rod in said tubular element having one end extending through said opening past the other surface of said plate,
      the lateral surface of the portion of said rod in said opening being in slidable contact with the wall of the opening so as to permit the rod to be moved transversely of the axis of the opening,
      the lateral surface of the opposite end of said rod engaging said tubular element adjacent its end,
      said rod along the length thereof intermediate its said opposite end and said plate having a cross section of smaller dimension than the surrounding wall of said tubular element,
      the stiffness of said tubular element being sufficiently less than the stiffness of said rod that transverse movement of said rod causes said tubular element to bend so that its end moves laterally with said opposite end of said rod;
   and means engaging said one end of said rod for effecting transverse movement thereof.
2. The combination of claim 1, wherein said element and said rod are of different moduli of elasticity.
3. The combination of claim 1, including
   a housing forming a fluid chamber,
      the surface of said plate opposite said one surface thereof forming one wall of said chamber;
   and a member in said chamber coupled to said one end of said rod and movable in response to a predetermined pressure of fluid therein to move said one end of said rod transversely.
4. The combination of claim 1 wherein said lateral surface of the opposite end of said rod slidably engages said element.
5. The combination of claim 1, wherein said tubular element extends into said opening and the inner wall thereof is slidably engaged by said rod.
6. The combination of claim 3, wherein said movable member includes a snap action disc spring coupled to said one end of said rod;
   a diaphragm overlaying said disc spring,
      said chamber having fluid inlet ports on opposite sides of said diaphragm, and said spring being snap deflected to move said one end of said rod transversely when the pressure on the side of said diaphragm opposite said plate exceeds by a predetermined amount the pressure on the side of said diaphragm nearest said plate.
7. The combination of claim 6, including an arm extending laterally from said one end of said rod; and an element carried by said spring and engaging said arm.